United States Patent [19]

Takahama et al.

[11] 4,280,057
[45] Jul. 21, 1981

[54] A SURVEYING INSTRUMENT HAVING MEANS FOR TRANSMITTING SIGNALS BETWEEN AN ALIDADE AND A FIXED MEMBER

[75] Inventors: Akio Takahama, Kawasaki; Tatsuro Hatano, Yokohama, both of Japan

[73] Assignee: Nippon Kogaku K.K., Tokyo, Japan

[21] Appl. No.: 955,779

[22] Filed: Oct. 30, 1978

[30] Foreign Application Priority Data

Oct. 29, 1977 [JP] Japan .................................. 52-129246

[51] Int. Cl.³ .............................................. G02B 27/02
[52] U.S. Cl. ......................................... 250/551; 350/23
[58] Field of Search ................... 250/551, 199; 350/23; 455/600, 612, 613

[56] References Cited

U.S. PATENT DOCUMENTS

| | | |
|---|---|---|
| 3,256,766 | 6/1966 | Allesson . |
| 3,895,871 | 7/1975 | Strasser . |
| 3,977,793 | 8/1976 | Trotta .................... 350/23 X |
| 4,038,547 | 7/1977 | Hoesterey .............. 250/203 R X |
| 4,055,058 | 10/1977 | Tewsley et al. ............. 250/551 X |
| 4,109,998 | 8/1978 | Iverson ..................... 350/23 |
| 4,166,959 | 9/1979 | Ivie ......................... 250/351 |

Primary Examiner—David C. Nelms
Assistant Examiner—Edward P. Westin
Attorney, Agent, or Firm—Fitzpatrick, Cella, Harper & Scinto

[57] ABSTRACT

A survey instrument having an alidade portion and a fixed portion rotatably holding the alidade portion. The survey instrument comprises a light-emitting portion provided in at least one of the alidade portion and the fixed portion, a light-receiving portion provided in the other of the alidade portion and the fixed portion so as to make a pair with the light-emitting portion, and a transmission optical system for directing to the light-receiving portion the beam emitted from the light-emitting portion.

7 Claims, 4 Drawing Figures

A SURVEYING INSTRUMENT HAVING MEANS FOR TRANSMITTING SIGNALS BETWEEN AN ALIDADE AND A FIXED MEMBER

BACKGROUND OF THE INVENTION

1. Field of the Invention

This invention relates to signal transmission means for giving and taking signals between an alidade portion and a fixed portion in a survey instrument having an alidade portion and a fixed portion rotatably holding the alidade portion.

2. Description of the Prior Art

Recently, along with the introduction of electronic techniques into various optical instruments, there have come to be seen in the field of survey instruments the devices in which electronic parts are combined with optical parts. There are theodolites which utilize a rotary encoder to obtain an electrical signal corresponding to the angle of rotation of a telescope and there are also tachymeters which effect distance measuring and measurement of angle and put out these as electrical signals. Each of these survey instruments comprises an alidade portion having a measuring portion consisting of a telescope or the like, and a fixed portion rotatably holding the alidade portion. In such a survey instrument, there are the following measures for taking out and recording the measured electrical signals:

(a) providing the alidade portion with a recording device;

(b) connecting together the alidade portion and the recording device by means of a cord; and (c) transmitting the electrical signal from the alidade portion through a slip ring to a lower board (which is a part of the fixed portion) and connecting the lower board to the recording device by means of a cord.

However, these instruments heretofore proposed have their own disadvantages, as shown below.

(a′) Since the alidade portion becomes large, the entire survey instrument is unstable and weak against vibration and wind or the like.

(b′) During the operation, the cord clings to the instrument and reduces the operability.

(c′) Unsatisfactory contact is likely to occur at the portion of the slip ring.

SUMMARY OF THE INVENTION

It is an object of the present invention to provide signal transmission means in a survey instrument wherein the give and take of signals between the alidade portion and the fixed portion is effected without contact.

According to the present invention, the survey instrument having an alidade portion and a fixed portion rotatably holding the alidade portion comprises a light-emitting portion provided in at least one of said alidade portion and said fixed portion, a light-receiving portion provided in the other of said alidade portion and said fixed portion so as to make a pair with said light-emitting portion, and a transmission optical system for directing to said light-receiving portion the beam emitted from said light-emitting portion, the light path of said transmission optical system passing substantially through the center of rotation of said alidade portion.

The invention will become more fully apparent from the following detailed description of some embodiments thereof taken in conjunction with the accompanying drawings.

DESCRIPTION OF THE PREFERRED EMBODIMENTS

Figure 1:
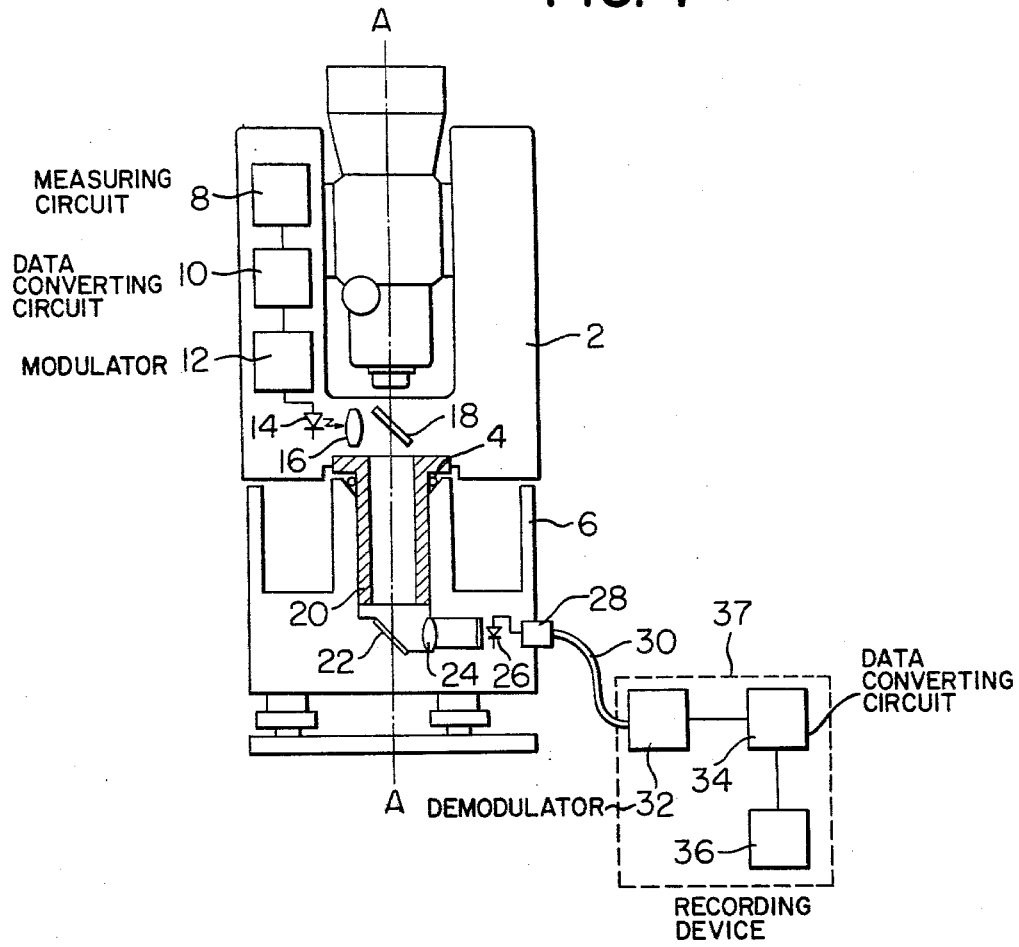
FIG. 1 schematically shows a first embodiment of the present invention.

Referring to FIG. 1, it shows an embodiment of the present invention. An alidade portion 2 is placed on a lower board 6 by means of an annular bearing 4 so as to be freely rotatable about a central axis A—A. The alidade portion 2 has a measuring circuit 8 which puts out as parallel data an electrical signal corresponding to an angle or a distance measured by known means. The parallel data from the measuring circuit 8 is applied as input to a data converting circuit 10. The data converting circuit 10 converts the parallel data from the measuring circuit 8 into serial data used for transmission. A modulator 12 amplifies and modulates the serial data from the data converting circuit 10 and the modulation signal drives a light-emitting diode 14. The light beam emitted from the light-emitting diode 14 is collimated by a transmission lens 16, whereafter the light path thereof is bent toward the lower board by a reflective mirror 18. At this time, the position of the reflective mirror 18 is so set that the light beam passes through the rotational axis A—A of the alidade portion 2. The light beam reflected by the mirror 18 passes through a cavity provided in the supporting shaft 20 of the alidade 2 and again the light path thereof is bent by a reflective mirror 22 provided in the lower board 6. The light beam whose path has been bent by the mirror 22 is condensed onto a photoelectric converter element 26 by a reception lens 24. The electrical signal from the photoelectric converter element 26 is taken out of the lower board 6 through a connector 28 and a cable 30. A demodulator 32 amplifies the photoelectric conversion signal from the photoelectric converter element 26 and then puts out a serial data. A data converting circuit 34 converts the serial data put out from the demodulator 32 into a data in the form required by a recording device 36. The recording device 36 may be replaced by an indicator device. The demodulator 32, the data converting circuit 34 and the recording device 36 are usually contained in a common package 37. The lower board 6, the cable 30 and the package 37 together constitute a fixed portion.

With such a construction, during measurement, the light signal from the light-emitting diode 14 surely enters the photoelectric converter element 26 even if the alidade 2 is rotated on the lower board 6, because the light transmission path passes substantially through the center of rotation of the alidade 2. Also, the signal transmission path does not limit the rotation of the alidade 2. Further, the signal transmission is effected by light transmission and this eliminates the trouble such as unsatisfactory contact which would occur if an electrical contact is used.

In the foregoing embodiment, if the reception lens 24 and the photoelectric converter element 26 are disposed at the lower end of the cavity provided in the supporting shaft 20, the mirror 22 could be eliminated. Also, the mirror 22, the reception lens 24 and the photoelectric converter element 26 provided in the lower board 6 need not always be provided in the lower board, but for example, the light beam reflected by the mirror 22 can be made to emerge directly out of the lower board 6. Also, the cable 30 may be optical fiber and the photoelectric converter element 26 may be disposed outside the lower board 6.

Figure 2:
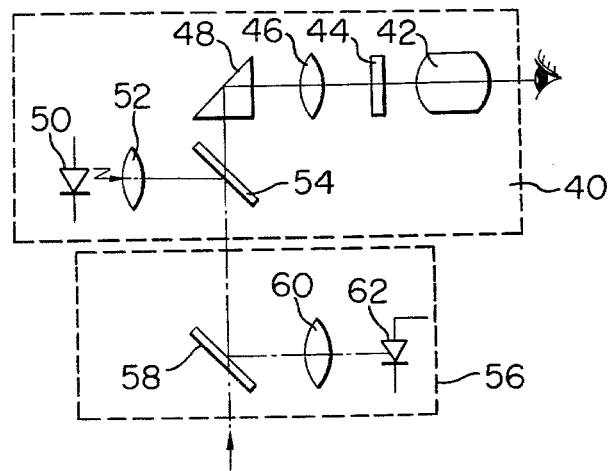
FIG. 2 conceptionally shows a second embodiment of the present invention.

In the foregoing embodiment, a cavity is provided in the supporting shaft 20 in order that the light beam emitted by the light-emitting diode 14 of the alidade portion 2 may be directed to the lower board 6. However, it is usually the case with a survey instrument that a through-opening is provided in the lower bed, the leveling bed and the pedestal of the tripod so as to enable the operator to see just beneath the rotational axis of the alidade portion through a centripetal telescope provided in the alidade portion. Another embodiment of the present invention utilizes such through-opening. FIG. 2 conceptionally shows a second embodiment of the present invention. In the alidade portion 40, there are an eyepiece 42, a focusing plate 44 and an objective lens 46 which together constitute an optical plummet scope, and a triangular prism 48 for bending the light path of the centripetal telescope and for aligning the light path with the rotational axis of the alidade portion. In the alidade portion 40, there are further provided a light-emitting diode 50 and a transmission lens 52 for transmitting a measured value by infrared light, and a dichroic mirror 54 for passing therethrough a light beam entering the centripetal telescope and for reflecting the infrared light from the transmission lens 52. At 56 indicating the lower board, the leveling bed or the pedestal of the tripod, there is a dichroic mirror 58 which reflects infrared light and passes therethrough visible light. Therefore, only the infrared light from the light-emitting diode 50 is condensed onto a photoelectric converter element 62 by a reception lens 60.

Figure 3:
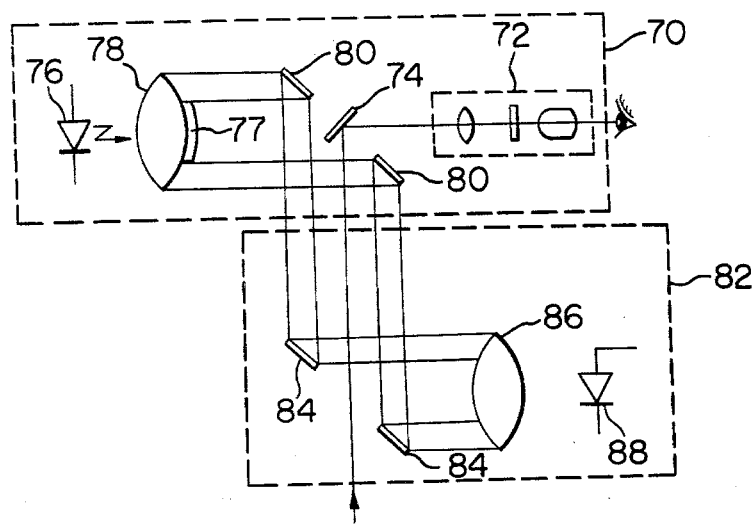
FIG. 3 conceptionally shows a third embodiment of the present invention.

FIG. 3 shows a third embodiment of the present invention in which the light beam entering the optical plummet and the light beam from the light-emitting diode travel along discrete light paths. The optical plummet scope 72 provided in the alidade portion 70 receives the light beam reflected by a mirror 74. The light beam emitted from the light-emitting diode 76, has the central portion thereof intercepted by an optical shielding member 77 and is collimated by a transmission lens 78 which is designed to pass therethrough only the marginal portion of the light beam. The collimated light beam is reflected by a doughnut-shaped mirror 80 and becomes a beam parallel to the rotational axis of the alidade portion 70. The light beam passed through the through-opening is reflected by a doughnut-shaped mirror 84 provided at 82 indicating the lower board, the leveling bed or the pedestal of the tripod, whereafter the light beam is condensed onto a photoelectric converter element 88 by a reception lens 86.

In case of the present embodiment, the light path of the light beam entering the optical plummet scope 72 and the light path of the light beam emitted from the light-emitting diode 76 are separated from each other, and thus a diode emitting infrared light need not be used as the light-emitting diode 76.

According to the second and the third embodiment described above, the light beam from the light-emitting diode and the light beam entering the optical plummet may be easily separated from each other.

In the foregoing embodiments, description has been made by taking as an example the case where the signal is transmitted from the alidade portion to the fixed portion, but in view of the reversibility of the light, modification can be made such that the signal is reversely transmitted from the fixed portion to the alidade portion. In case of an electrooptical distance measuring instrument, this example may be used to cause a start signal for effecting light emission of the light emitting diode to be delivered from the fixed portion to the alidade portion, and it is also possible to deliver a changeover signal for selectively effecting the light emission of a light-emitting diode of different wavelength. That is, remote control becomes possible. Further, if the portion between the alidade portion and the fixed portion is made bidirectional, application of the device will be increased.

Figure 4:
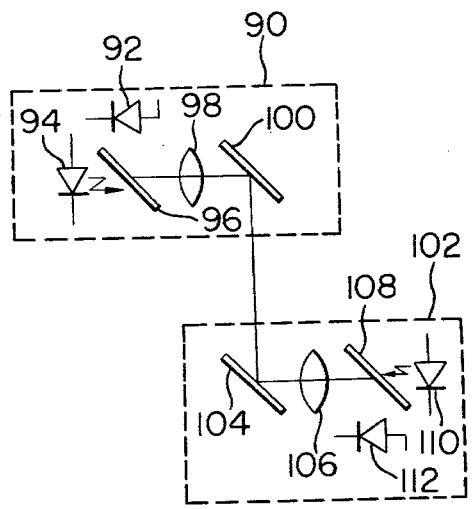
FIG. 4 conceptionally shows a fourth embodiment of the present invention.

FIG. 4 shows an embodiment in which the portion between the alidade portion and the fixed portion is made bidirectional. In the alidade portion 90, there are a photoelectric converter element 92, a light-emitting diode 94, a half-mirror 96, a transmission-reception lens 98 and a mirror 100. The photoelectric converter element 92 and the light-emitting diode 94 are placed at the focal position of the transmission reception lens 98. At 102 which indicates the lower board, the leveling bed or the pedestal of the tripod, there are a mirror 104, a transmission-reception lens 106, a half-mirror 108, a light-emitting diode 110 and a photoelectric converter element 112. The light-emitting diode 110 and the photoelectric converter element 112 lie at the focal position of the transmission-reception lens 106. With such an arrangement, if a measurement signal is delivered from the light-emitting diode 94 of the alidade portion 90 and this measurement signal is photoelectrically converted by the photoelectric converter element 112 at 102 and if an instruction signal is delivered from the light-emitting diode 110 at 102 and such signal is photoelectrically converted by the photoelectric converter element 92 at the alidade portion 90, then the portion between the alidade portion 90 and the fixed portion 102 becomes bidirectional.

According to the present invention, as described above, the light beam emitted from a light-emitting diode or the like is transmitted substantially along the rotational axis of the alidade portion, whereby give and take of signals between the alidade portion and the fixed portion can be effected with non-contact irrespective of the rotation of the alidade portion.

What we claim is:

1. A survey instrument having an alidade portion and a fixed portion rotatably holding the alidade portion, comprising:

a light-emitting portion provided in at least one of said alidade portion and said fixed portion;

a light-receiving portion provided in the other of said alidade portion and said fixed portion so as to make a pair with said light-emitting portion;

first optical means provided in at least one of said alidade portion and said fixed portion together with said light-emitting portion, the first optical means collimating substantially the light beam from said light-emitting portion and directing the collimating beam to said other of said alidade portion and said fixed portion so that the collimated beam may be substantially parallel to the axis of rotation of said alidade portion; and second optical means provided in said other of said alidade portion and said fixed portion together with said light-receiving portion, the second optical means being so formed that a certain amount of the light beam from said first optical means may be always incident on the second optical means notwithstanding rotation of said alidade portion, the second optical means condensing the light beam from said first optical means on said light-receiving element;

said alidade portion has an optical plummet scope; said fixed portion has a through-opening for said optical plummet scope; and the light path between said light-emitting portion and said light-receiving portion is partly used for the optical path of said optical plummet scope.

2. A survey instrument according to claim 1, wherein said light-emitting portion includes a first light-emitting element for emitting infrared light and said light-receiving element includes a first photoelectric converter element responding to the infrared light.

3. A survey instrument according to claim 2, wherein said first optical means includes a first optical device for substantially collimating the infrared light from said light-emitting element, and a first dichroic mirror for superimposing the path of the collimated infrared light onto said light path of said optical plummet scope, the dichroic mirror being inclined in the light path of said optical plummet scope to direct the infrared light to said second optical means, and said second optical means includes a second dichroic mirror inclined in the light path of the optical plummet scope to divide at least a part of the collimated light from the light path of the optical plummet scope, and a second optical device for condensing the divided light onto said photoelectric converter element.

4. A survey instrument according to claim 3, wherein the light path of said first optical device is coincident with that of said second optical device, and those light paths are substantially coincident with the light path of said optical plummet scope between said first and second dichroic mirrors.

5. A survey instrument according to claim 4, wherein said first optical means further includes a first semi-transparent mirror inclined between said first light emitting element and said first optical device;

said second optical means further includes a second semi-transparent mirror inclined between said second optical device and said first photoelectric converter element;

either one of said alidade portion and fixed portion further including a second photoelectric converter element disposed on the light path bent by said first semi-transparent mirror in a conjugate position with said first light-emitting element with respect to said first optical device; and the other of said alidade portion and said fixed portion including a second light-emitting element in the optical path bent by said second semi-transparent mirror in a conjugate position with said first photoelectric converter element with respect to said second optical device.

6. A survey instrument according to claim 1, wherein said alidade portion has a measuring device for putting out an electrical signal corresponding to a measured distance, angle or the like; and said light-emitting portion is provided in said alidade portion and emits a light signal corresponding to the electrical signal put out from said measuring device.

7. A survey instrument according to claim 5, wherein said fixed portion has a board on which said alidade portion is rotatably placed, and a processing portion for operation-processing in a predetermined form from the signal photoelectrically converted by the light-receiving portion; and said second optical means has optical fiber means through which the light signal from said light emitting portion is transmitted to said processing portion.

* * * * *